United States Patent [19]

Cobb et al.

[11] 4,230,521
[45] Oct. 28, 1980

[54] FOAM IMPREGNATING APPARATUS

[75] Inventors: A. Lawrence Cobb, Rochester; Leland D. DuBrock, Troy, both of Mich.

[73] Assignee: Composite Technology Corporation, Troy, Mich.

[21] Appl. No.: 33,591

[22] Filed: Apr. 26, 1979

[51] Int. Cl.² ............................................. B32B 31/04
[52] U.S. Cl. .................................. 156/549; 156/324; 427/209; 427/359; 427/369
[58] Field of Search ........................ 156/77–79, 156/324, 349, 543, 549, 547, 550; 428/311, 313, 315; 427/355, 359, 369, 209–211, 365; 118/261; 264/48, 46.4

[56] References Cited

U.S. PATENT DOCUMENTS

| | | | |
|---|---|---|---|
| 3,179,551 | 4/1965 | Dudas | 156/209 X |
| 3,360,415 | 12/1967 | Hellman et al. | 427/365 X |
| 3,511,696 | 5/1970 | Murray | 118/261 X |
| 3,773,600 | 11/1973 | Rudnev | 156/324 X |
| 3,915,783 | 10/1975 | Goppel et al. | 428/315 X |
| 4,049,848 | 9/1977 | Goodale et al. | 427/369 X |
| 4,064,288 | 12/1977 | Shah | 427/211 X |

Primary Examiner—David A. Simmons
Attorney, Agent, or Firm—Reising, Ethington, Barnard, Perry & Brooks

[57] ABSTRACT

An apparatus for forming continuous lengths of composite material comprised of a core of resilient and open-cell foam material impregnated with an uncured thermosetting resin and which core element is overlaid with at least one outer layer of a reinforcing material.

9 Claims, 8 Drawing Figures

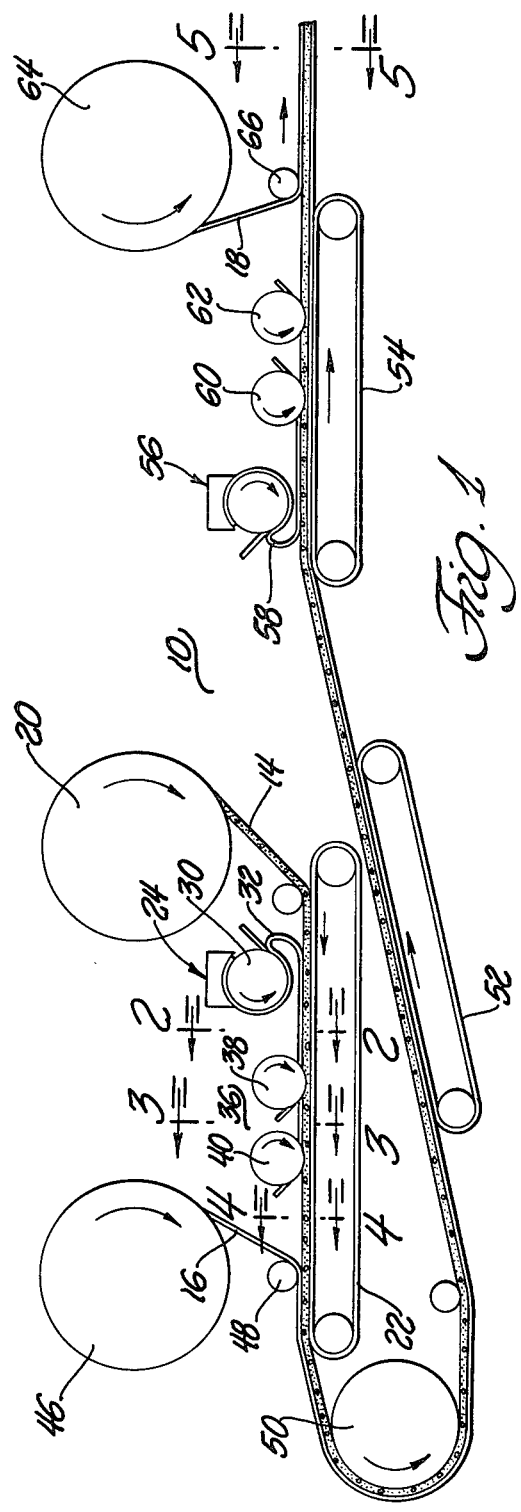

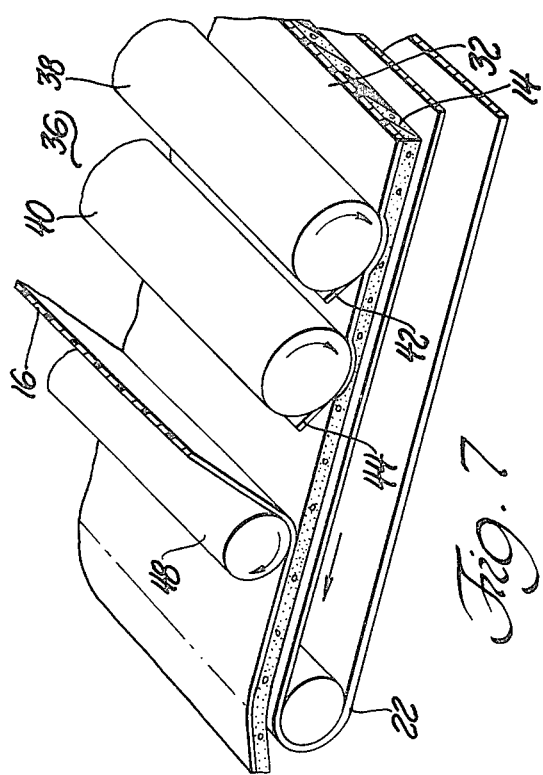
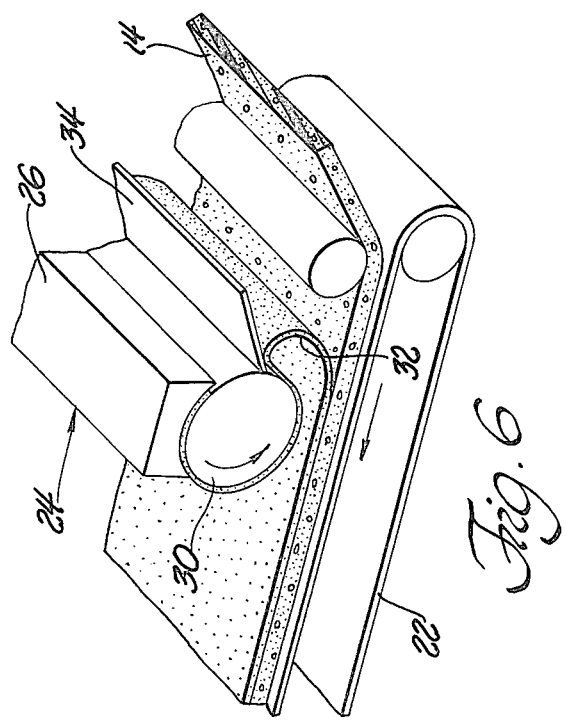
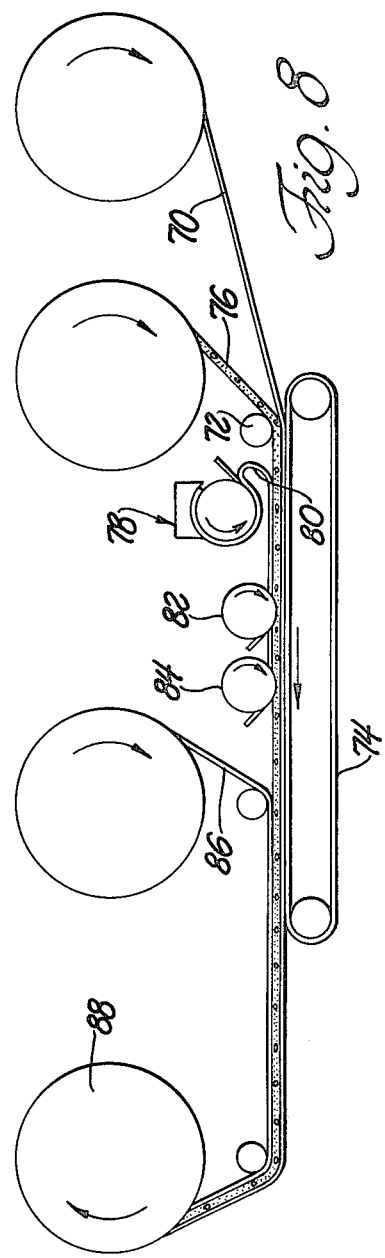

FOAM IMPREGNATING APPARATUS

TECHNICAL FIELD

The present invention relates to an apparatus for forming continuous lengths of composite material comprised of a core of resilient and open-cell foam material impregnated with an uncured thermosetting resin and which core element is overlaid with at least one outer layer of a reinforcing material, and which composite structure may be ultimately cut into discrete lengths and used in the molding of a rigidified and relatively impervious structure at such time as the resilient core structure is compressed to fill the open cells thereof with the resin, the latter which is cured to a hardened state while maintaining the core element under compression.

It is a more specific object of this invention to provide such a preformed laminar structure which may be formed in continuous lengths and in such a way that the uncured resin content thereof is accurately controlled and distributed throughout the extent of the resilient open-cell core element and which preformed structure may be thereafter stored until such time as discrete lengths of such structure are to be severed and incorporated in fabricated and cured products.

BACKGROUND ART

It is known in the prior art to form a composite structure comprised of an initially open-cell resilient foam the open cells of which have been impregnated with an uncured thermosetting resin and at least one surface of which foam layer is overlaid with a layer of reinforcing material and wherein the foam layer is compressed to fill the open cells of the foam with the uncured resin and, further, wherein the excess resin is extruded outwardly to impregnate the reinforcing layer and which composite is cured while maintaining the foam in a compressed condition. The process results in a relatively impervious and rigidified composite structure. However, also in the past it has been the practice to prepare such preformed material as an individual, uncured, resin-impregnated sandwich immediately prior to the molding operation. Such individual or batch assembling of the preformed composite has the disadvantages of requiring a great deal of hand labor, thus increasing the cost of any product made in such fashion, and in making it difficult to accurately and consistently control the quantity of resin used and its dispersion throughout the composite.

The prior art teaches several methods for the preparation of such a composite preformed material and all of which methods are basically hand-layup or batch preparation methods. A first method taught by the prior art involves the placing of a first layer of reinforcing material, such as fiberglass mat, in a mold or on a platen; placing one or more layers of initially resilient and open-cell foam upon such reinforcing layer; pouring or otherwise spreading an uncured thermosetting resin over the surface of the resilient and open-cell foam; laying another sheet of reinforcing layer over the resin-coated surface of the foam; and thereafter compressing the reinforced foam layer with a movable mold member or platen to compress the composite to fill the open cells of the foam and extrude excess resin so as to impregnate the reinforcing layers and, while maintaining the composite in such a compressed condition, curing the thermosetting resin. Composite structures molded by the method described are generally shown in U.S. Pat. No. 3,193,437 Schafer, U.S. Pat. No. 3,867,221 Chant, and U.S. Pat. No. 3,944,704 Dirks.

Another method of preparing such composite includes the step of pre-impregnating the open-cell and resilient foam with an uncured thermosetting resin by passing the same through a reservoir of such resin and passing such foam material through rolls to extrude or wring out excess resin. Thereafter, the previous process is repeated wherein a first layer of reinforcing material is placed in a mold, followed by overlaying the resin-impregnated, resilient foam layer over the reinforcing layer, and finally completing the composite by overlaying the same with a second layer of reinforcing material after which the compressing and curing steps take place. Such pre-impregnated foam, utilizing dipping and wringing out liquid resin, is difficult to store in continuous lengths and usually results in the use of excess resin.

DISCLOSURE OF THE INVENTION

The present invention relates to an apparatus for making continuous lengths of preformed laminar composites having an initially resilient and open-cell core element impregnated with an uncured, thermosetting resin and to which core element at least one layer of a reinforcing material is adhered by said uncured resin. The apparatus of the present invention includes a device for metering a film of uncured thermosetting resin substantially across the width of the resilient foam core element as well as means for compressing the resilient foam core element to disperse the uncured resin film throughout the open cells of said foam. After the impregnation of the open cells of the core element with the uncured thermosetting resin, further means is provided for applying at least one layer of a reinforcing material to the outer surface of said core element and which reinforcing layer is adhered to the core element by the uncured resin.

In a preferred embodiment of the present invention, the apparatus is adapted to apply a film of uncured thermosetting resin to each outer surface of the open-cell core element and to provide means for sequentially compressing the open-cell foam element to disperse the uncured resin films throughout the open cells of the core element and also to provide means for applying reinforcing layers to each of the outer surfaces of the core element. Since the apparatus of the present invention disperses the uncured resin films within the open-cell core element, only sufficient resin is left at the surfaces of said core element to lightly adhere the reinforcing layers thereto which enables the preformed laminar composite to be stored by rolling the composite upon itself and to be subsequently unrolled without adjacent layers of the composite structure adhering to each other.

In the preferred form of the subject invention, a continuous length of initially resilient and open-cell foam is fed upon a supporting surface which moves with the advancing foam sheet. A device is provided for metering a measured film of uncured, thermosetting resin substantially across the width of said moving foam sheet. Immediately after leaving said resin-metering device, the foam sheet is compressed against the supporting surface so as to disperse the uncured resin throughout the open cells of the core element subadjacent the compressing means. After leaving the first foam compressing means, the partially resin-impregnated foam sheet is inverted to expose the other side of said foam sheet, after which a second device meters a second measured film of uncured resin to the said other side of the foam sheet. Immediately thereafter, a second means is provided for again compressing the foam sheet to disperse the second metered film of uncured resin into the remaining open cells of the foam member. Immediately after the first and second foam compressing means disperse their respective uncured resin films within the open cells of the foam, continuous sources of reinforcing sheet materials are applied to the outer surfaces of the impregnated foam sheet and lightly adhered thereto by the uncured resin. After the formation of the preformed laminar composite, including the uncured, resin-impregnated core element and overlaid reinforcing layers, the laminar composite or sandwich may then be rolled upon itself and stored until such time as it is desired to cut discrete lengths of said sandwich from the continuous source for molding and curing a composite structure.

Reference is now made to the drawings and following description wherein the invention is described in detail.

BRIEF DESCRIPTION OF DRAWINGS

FIG. 1 is a side elevational view of the preferred embodiment of the apparatus;

FIG. 2 is a cross sectional view along line 2—2 of FIG. 1;

FIG. 3 is a cross sectional view along line 3—3 of FIG. 1;

FIG. 4 is a cross sectional view along line 4—4 of FIG. 1;

FIG. 5 is a cross sectional view along line 5—5 of FIG. 1;

FIGS. 6 and 7 are enlarged perspective views of the resin-metering device and compression rolls of FIG. 1; and FIG. 8 is a second embodiment of the apparatus of the invention.

BEST MODE FOR CARRYING OUT THE INVENTION

A preferred embodiment of the invention is shown generally at 10 in FIG. 1. A cross section of a laminar composite structure formed by the apparatus of FIG. 1 is depicted at 12 in FIG. 5. The laminar composite includes a core element 14 comprised of a resilient, open-cell foam material, such as polyurethane, the open cells of which are at least partially impregnated with an uncured thermosetting resin in liquid form. Any suitable resin, such as epoxy, polyester, polyvinyl or the like, may be used.

In referring to an open-cell foam is meant a foam in which at least 85% of the cells are in open communication with adjacent cells. Typically, such open-cell foam element is from one-half to one inch in thickness and has a density of about 1.8 lbs. per cu. ft. A typical resin used to impregnate the open-cell foam is an epoxy based on Shell 828 with an adducted diethylene-triamene plus fillers and extenders as desired.

The outer surfaces of core element 14 are respectively overlaid with reinforcing sheets or layers 16 and 18. At this stage the uncured resin disposed does not encapsulate the reinforcing layers 16 and 18 but, being tacky and present on the foam surface, lightly adheres the layers to foam core element 14. Most preferably the reinforcing layers are formed of continuous sheets of fiberglass which may either be in woven form or of chopped fibers, and which layer has a weight of about one ounce per sq. ft.

Laminar composite structure 12 is adapted to be stored in the uncompressed form as shown in FIG. 8, and since little or no resin completely permeates the reinforcing layers 14 and 16, the uncured resin is not present at the outer surfaces of the fiberglass reinforcing, whereby the composite structure can be stored in roll form if desired. At such time as a product is to be molded, a predetermined length of laminar composite 10 may be cut from the preformed and stored continuous length. In the alternative, it is possible to cut discrete lengths of the laminar composite as it leaves apparatus 10 and thereafter used immediately or stored in such pre-cut lengths.

At such time as a pre-cut length of composite structure 12 is to be molded and formed into a product, it is placed within a mold or between platens and compressed under a pressure of 50–100 psi. During compression the uncured resin fills the open cells of the foam core element and excess resin is extruded outwardly to encapsulate the reinforcing layers 16 and 18. While maintaining the composite in its compressed state, heat in the range of 200°–300° F. is applied to cure the resin and produces a relatively impervious, rigidified structure.

Reference is now made to the apparatus 10 of FIG. 1. A continuous source or roll of open-cell, resilient foam is indicated at 20. A first movable support surface or continuous belt member is shown at 22. Means is provided, infra, to feed foam sheet 14 from source 20 and to lay such sheet on moving belt 22. A first resin-metering device is indicated generally at 24 and is positioned above continuous belt 22. As best seen in the perspective view of FIG. 6, metering device 24 comprises a reservoir or tank 26 which contains a liquid thermosetting resin. Reservoir 26 has either an open or perforated bottom enabling the liquid resin to be deposited upon the surface of a subadjacently disposed rotating roll 30. Suitable means, not shown, is provided to vary the vertical gap or distance between reservoir 26 and roll 30 to effect the quantity of resin deposited on roll 30. As roll 30 rotates in a counterclockwise direction, a film of resin 32 is deposited upon the roll surface. The thickness of the resin film as deposited on the roll is determined by several variables including the viscosity of the resin mixture, the gap between reservoir 26 and roll 30, and the speed of rotation of roll 30. Each of the foregoing may be adjusted to accurately control the quantity of resin ultimately deposited upon the surface of foam sheet 14.

Metering device 24 also includes a scraper blade 34 which peels or separates the resin film from roll 30. Resin film 32 is thereby deposited on the surface of foam sheet 14 as it passes beneath the metering device.

A foam sheet driving and compressing mechanism is shown generally at 36 and is positioned immediately downstream of metering device 24. Mechanism 36 includes a pair of driving rolls 38 and 40. Depending on the frictional load or drag in apparatus 10, drive rolls 38 and 40, acting through foam sheet 14, either provide the driving force for continuous belt 22 or independent means, not shown, can be provided to drive such belt at a speed matched to that of the driving rolls. As best seen in the perspective view of FIG. 7, rolls 38 and 40 sequentially compress foam sheet 14 against moving surface or belt 22 to disperse the resin of film 32 within the open cells of the foam sheet. Blades 42 and 44 are respectively associated with rolls 38 and 40 for scraping off any excess resin adhering thereto.

While a single foam-compressing and resin-impregnating roll may be used, it has been found that a more homogeneous dispersion of the resin within the foam sheet is attained by the use of the sequential compression and intermittent release action of rolls 38 and 40.

The depositing and dispersion of resin within the foam sheet is diagrammatically portrayed in the enlarged views of FIGS. 2 through 5. FIG. 5 depicts the resin film 32 resting on foam sheet 14 just prior to engagement by compression roll 38. FIG. 3 represents the resin partially dispersed within the foam sheet after leaving roll 38. FIG. 4 shows the resin of film 32 fully dispersed throughout the approximately upper half of foam sheet 14 after leaving roll 38.

FIG. 4 also demonstrates that with a foam sheet having a certain thickness, e.g. one inch or more, the resin is either not dispersed or not generally equally dispersed throughout the entire thickness of the foam. Obviously, the thinner the foam sheet, the more likely is such resin dispersion to be homogeneous or equal. To insure such equal dispersion of resin throughout foam sheet 14, means, infra, is provided to apply a second resin film to the other side of the foam sheet.

Prior to applying a second resin film to the other side of foam sheet 14, a first fiberglass reinforcing layer or sheet 16 is applied to the foam sheet from a source 46. Roll 48 forces reinforcing layer 16 against the resin-impregnated surface of the foam sheet and is lightly adhered thereto by the uncured resin.

In order to expose the other surface of foam sheet 14, the partially resin-impregnated sheet is passed over and is inverted by roll 50. An intermediate, continuous belt surface 52 is adapted to support the now inverted foam sheet as it moves to a third continuous belt assembly 54. A second resin-metering device 56, identical to device 24, is disposed proximately above belt assembly 54 and is adapted to deposit a second resin film 58 upon the uncoated side of foam sheet 14. Third and fourth rolls 60 and 62 are adapted to drivingly engage and compress foam sheet 14 to disperse the resin of the second film 58 throughout the remainder of the open foam cells. A second layer or sheet 18 of a fiberglass from a source 64 passes under roll 66 and is thereby overlaid and lightly adhered to the impregnated foam sheet 14.

As it leaves belt assembly 54 and roll 66, the preformed laminar composite is of the configuration shown in FIG. 5. As noted above, the laminar composite 12 may be either cut in discrete lengths as it leaves belt assembly 54 and roll 66 or it may be rolled in a continuous length for storage and subsequent cutting.

A further modification of the invention is shown in FIG. 8 and is intended for use with a relatively thin foam sheet, e.g. one-half inch or less, wherein a single resin film may be applied and dispersed substantially evenly throughout the open cells of the foam. In the apparatus of FIG. 8, a first fiberglass reinforcing layer or sheet 70 is fed beneath roll 72 to a moving belt assembly 74. An open-cell foam sheet 76 also passes beneath roll 72 and is laid upon reinforcing layer 70. Next, the reinforced foam passes beneath a resin-metering device 78 which is identical to device 24 as previously described. Device 78 again deposits a thermosetting resin film 80 upon the exposed surface of foam sheet 76 and which resin is dispersed within the foam cells by driving and compression rolls 82 and 84. In the case of such a relatively thin foam sheet or one with relatively large open cells, it is found that resin deposited on only one surface of the foam can be substantially equally dispersed throughout the foam cells.

After leaving compression roll 84, the resin-impregnated foam sheet 76 is overlaid with a second reinforcing fiberglass sheet 86 which is again lightly adhered to the foam by the uncured resin.

The modification of FIG. 8 also demonstrates the alternative of storing the reinforced and resin-impregnated, laminar composite as a roll 88.

Other modifications are possible within the intended scope of the invention as set forth in the hereinafter appended claims.

What is claimed is:

1. An apparatus for forming continuous lengths of uncured, resin-impregnated, laminar sheet structure, said apparatus comprising a source of open-cell, resilient, foam sheet; means for feeding said foam sheet from said source; a first means for supporting said foam sheet as it is fed from said source; a first liquid resin metering device adapted to discharge a first film of uncured, thermosetting resin upon one side of said foam sheet as it passes over said first supporting means, said foam sheet feeding means including first roller means for engaging and compressing said foam sheet against the first supporting means and causing said uncured resin to impregnate the open cells of a first portion of said sheet; second means for supporting the partially resin-impregnated foam sheet; a second liquid resin metering device adapted to discharge a second film of uncured resin upon the other side of said partially resin-impregnated foam sheet, said foam sheet feeding means including second roller means for engaging and compressing said foam sheet against said second foam sheet supporting means and causing the second resin film to impregnate the remaining open cells of said foam sheet; and means for applying a continuous sheet of reinforcing material to each side of said foam sheet, said reinforcing sheets being adhered to said foam sheet by said uncured resin.

2. An apparatus as set forth in claim 1 wherein said first and second foam sheet supporting means each includes a continuous surface engaging and moving with one surface of said foam sheet and wherein said first and second supporting means are longitudinally spaced from each other along the length of said foam sheet.

3. An apparatus as set forth in claim 1 wherein the means for applying said reinforcing sheets comprises first and second sources of reinforcing sheet material, first and second roller elements each respectively disposed subadjacent one of said reinforcing material sources for guiding the reinforcing sheet into abutting engagement with one side of the foam sheet as the foam sheet exits from the first and second compression roller means.

4. An apparatus as set forth in claim 1 wherein each of said first and second roller means includes a pair of adjacently disposed roller members for sequentially compressing said foam sheet to impregnate the subadjacent open cells thereof with the uncured resin.

5. An apparatus for forming continuous lengths of resin-impregnated, laminar sheet structure, said apparatus comprising a source of open-cell, resilient foam sheet; means for feeding said foam sheet from said source; a first means for supporting said foam sheet as it is fed from said source; a first liquid resin metering device adapted to discharge a first film of uncured thermosetting resin upon one side of said foam sheet as it passes over said first supporting means, said foam sheet feeding means including first roller means for engaging and compressing said foam sheet against the first supporting means and causing said uncured resin to impregnate the open cells of a first portion of said sheet; a first source of reinforcing sheet material; a first roller element for guiding said reinforcing sheet material into abutting engagement with said one side of said sheet of foam material as said foam material exits from said first compression roller means; means for inverting said partially impregnated foam sheet to expose the other side thereof; second means for supporting the partially resin-impregnated foam sheet upon the reinforcing material side thereof; a second liquid resin metering device adapted to discharge a second film of uncured resin upon the other side of said partially resin-impregnated foam sheet, said foam sheet feeding means including second roller means for engaging and compressing said foam sheet against said second foam sheet supporting means and causing the second resin film to impregnate the remaining open cells of said foam sheet; a second source of reinforcing sheet material; and a second roller element for guiding the reinforcing material from said second source into abutting engagement with said other side of said sheet of foam material as said foam material exits from said second compression roller means, said reinforcing sheets being adhered to said foam sheet by said uncured resin.

6. An apparatus as set forth in claim 5 wherein said first and second foam sheet supporting means each includes a continuous surface engaging and moving with said foam sheet and wherein said first and second supporting means are longitudinally spaced from each other along the length of said foam sheet.

7. An apparatus as set forth in claim 5 wherein said first and second roller means each includes a pair of adjacently disposed roller members for sequentially compressing said foam sheet to impregnate the open cells thereof with the uncured resin.

8. An apparatus as set forth in claim 5 wherein each resin metering device includes a roll spaced vertically above said foam sheet and including an axis of rotation transversely parallel to said foam sheet; a reservoir superadjacent said roll and adapted to discharge a film of uncured resin across the width of said roll; and a blade member disposed proximately along the width of said roll for separating said resin film from the roll whereby said resin film is deposited across the width of said foam sheet.

9. An apparatus for forming continuous lengths of resin-impregnated, laminar sheet structure, said apparatus comprising a source of open-cell, resilient foam sheet; means for feeding said foam sheet from said source; a first continuously moving means for supporting said foam sheet as it is fed from said source; a first liquid resin metering device adapted to discharge a first film of uncured thermosetting resin upon one side and across the width of said foam sheet as it passes over said first supporting means, said foam sheet feeding means including a first pair of adjacently disposed roller elements for sequentially engaging and compressing said foam sheet against the first supporting means and causing said uncured resin film to impregnate the open cells of a first portion of said sheet; a first source of reinforcing sheet material; a first roller member for guiding said reinforcing sheet material into abutting engagement with said one side of said sheet of foam material as said foam material exits from said first compression roller means; means for inverting said partially impregnated foam sheet to expose the other side thereof; a second continuously moving means for supporting the partially resin-impregnated foam sheet upon the reinforcing material side thereof; a second liquid resin metering device adapted to discharge a second film of uncured resin upon the other side and across the width of said partially resin-impregnated foam sheet, said foam sheet feeding means including a second pair of adjacently disposed roller elements for sequentially engaging and compressing said foam sheet against said second foam sheet supporting means and causing the second resin film to impregnate the remaining open cells of said foam sheet; a second source of reinforcing sheet material; and a second roller member for guiding the reinforcing material from said second source into abutting engagement with said other side of said sheet of foam material as said foam material exits from said second compression roller means, said reinforcing sheets being adhered to said foam sheet by said uncured resin.

* * * * *